United States Patent [19]

Severs, Jr.

[11] 3,855,280

[45] Dec. 17, 1974

[54] PROCESS FOR PRODUCING AN ALKENYL ALKANOATE FROM AN OLEFIN AND A CARBOXYLIC ACID

[75] Inventor: Glen Maurice Severs, Jr., Pasadena, Tex.

[73] Assignee: Celanese Corporation, New York, N.Y.

[22] Filed: Dec. 8, 1972

[21] Appl. No.: 313,299

[52] U.S. Cl.............................................. 260/497 A
[51] Int. Cl......................... C07c 67/04, C07c 69/14
[58] Field of Search................................ 260/497 A

[56] References Cited
UNITED STATES PATENTS

| | | | |
|---|---|---|---|
| 3,300,528 | 1/1967 | Wakasa et al. | 260/497 A |
| 3,404,177 | 10/1968 | Baba et al. | 260/497 A |
| 3,600,429 | 8/1971 | Kronig et al. | 260/497 A |
| 3,634,496 | 1/1972 | Kominami et al. | 260/497 A |
| 3,641,121 | 2/1972 | Swift | 260/497 A |

FOREIGN PATENTS OR APPLICATIONS

| 770,681 | 1/1972 | Belgium | 260/497 A |
|---|---|---|---|

OTHER PUBLICATIONS

Boutry, et al., Jr. of Catalysis 23, pp. 19–30 (1971).

*Primary Examiner*—Lorraine A. Weinberger
*Assistant Examiner*—Richard D. Kelly
*Attorney, Agent, or Firm*—Ralph M. Pritchett

[57] ABSTRACT

In a process for producing an alkenyl carboxylate, such as vinyl acetate, by reacting a carboxylic acid catalytically with an olefin in the presence of molecular oxygen under conditions which are maintained on the fuel-rich or oxygen-poor side of the explosive range, the lower limit of allowable oxygen concentration in the mixed reactants is increased, facilitating operation at increased oxygen concentration with resulting increase in reaction conversion rate, by incorporating a lower alkane, especially methane or ethane, into the mixture of gases being introduced into the reaction zone.

8 Claims, No Drawings

PROCESS FOR PRODUCING AN ALKENYL ALKANOATE FROM AN OLEFIN AND A CARBOXYLIC ACID

BACKGROUND OF THE INVENTION

Several processes are known whereby a carboxylic acid is reacted catalytically with an olefin and molecular oxygen to form a carboxylic acid ester of an unsaturated alcohol, the carboxylate moiety of which is derived from the carboxylic acid while the unsaturated alcohol moiety is derived from the olefin. Of particular commercial importance are processes for reacting ethylene, acetic acid, and molecular oxygen to form vinyl acetate. Analogous reactions are known in which higher homologs of ethylene are reacted with acetic acid or its higher homologs to form higher alkenyl acetates in particular or higher alkenyl esters of the higher homologs of acetic acid. In general these reactions are particularly adapted to the reaction of lower alkenes with lower alkanoic acids.

There are two variants of the above-identified processes which are of particular commercial importance and which are currently employed in the commercial production of vinyl acetate. It will be recognized, as mentioned above, that higher alkenyl carboxylates can be produced by the same type of reaction, although vinyl acetate is the product of greatest current commercial interest. The first of these variants comprises passing ethylene and molecular oxygen through a liquid reaction medium comprising acetic acid within which there is contained a catalyst system comprising acetate ions, a noble metal such as palladium, and a redox agent such as copper chloride. Modification of the reaction medium in this process (e.g., by having incorporated thereinto a substantial quantity of water) results in formation of substantial quantities of the acetate esters of 1,1-ethanediol or 1,2-ethanediol.

The other commercially important variant of these processes for producing alkenyl esters comprising passing a mixture of the carboxylic acid, the olefin, and molecular oxygen in the vapor phase through a reaction zone containing a solid catalyst (which can be in the form of a fixed bed or which can be employed as a fluid bed) which has a noble metal, particularly a Group VIII noble metal and especially palladium, as an essential component. In particularly useful versions of this vapor-phase process the catalyst comprises a suitable support impregnated with palladium, an alkali metal acetate such as potassium acetate, and, in a particular preferred formulation, gold. Catalysts of the particularly preferred type are disclosed in Netherlands Pat. application No. 6717038(June 18, 1968), by Farbenfabriken Bayer Aktiengesellschaft. The use of such catalysts in preparing vinyl acetate by a vapor phase reaction is discussed in further detail by W. Schwerdtel in "Chemistry and Industry," Nov. 9, 1968, pp 1559-1563. Catalysts also suited for the vapor-phase production of unsaturated esters including vinyl acetate and consisting essentially of supported Group VIII noble metals and their oxides and salts are described in U.S. Pat. No. 3,190,912, to R. E. Robinson. A process for producing vinyl acetate by a so-called "trickle phase" process in which ethylene and oxygen are passed over a solid catalyst bed irrigated with liquid acetic acid is also described in U.S. Pat. No. 3,275,680, to H. Holzrichter, et al. The catalysts employed in this patent comprise a supported noble metal, particularly palladium, employed in the presence of an alkali metal acetate which can be contained in the liquid acetic acid phase with which the catalyst bed can be irrigated during the course of the reaction.

In all of the above-identified processes, both those in which all the reactants are passed through the reaction zone in the vapor phase and those in which a portion is passed through in the liquid phase, considerations of safety require that the mixture of reactant gases introduced into the reactor not have an oxygen:fuel ratio such that the mixture is within the explosive range. In addition, considerations of chemical efficiency require that the mixture be on the fuel-rich (or oxygen-poor) side of the explosive range inasmuch as a mixture containing so much oxygen as to be on the oxygen-rich side of the explosive range would yield carbon oxides or similar low-value materials as the reaction product rather than the desired unsaturated ester.

Thus, all of the prior art in this family of related processes has entailed feeding into the reaction zone a mixture of gases comprising predominantly olefin (e.g. ethylene), carboxylic acid (in those processes is which the carboxylic acid is passed through the reaction zone in the gas phase), lesser quantities of inert diluent such as carbon dioxide and/or nitrogen, and small amounts of oxygen, of the order of 5 volume percent. Ideally, the reaction feedstock consists solely of olefin, carboxylic acid, and oxygen, but the reaction is conducted at a low conversion per pass which results in the need to recover and recycle a substantial amount of unreacted olefin at the conclusion of the reaction step. This requires, for economic reasons, allowing a certain quantity of inert diluent to remain in the recycle gas stream, so some carbon dioxide and other inert gases are also present in the reactant feed mixture. The prior art has attributed explosibility-suppression properties to carbon dioxide, but has considered it desirable to keep other inert diluents in the recycle stream at a minimum.

The gas recycle system, as well as the reaction and primary product recovery systems, employed in the vapor-phase production of vinyl acetate from ethylene and acetic acid is described in the "Chemistry and Industry" paper by Schwerdtel which has been referred to above. The same paper also explains the constraints which are imposed upon the process by the necessity of employing oxygen concentrations which are below the lower explosive limit of oxygen in admixture with the other components of the reactant gases, pointing out that this limitation on oxygen concentration also limits the conversion obtainable in the process; more particularly, oxygen conversion is 60–70%, acetic acid conversion is about 20%, and ethylene conversion is only about 10% within the reaction zone. At such low conversions, it will be seen that the process must bear a heavy burden of investment and operating costs for separating unconverted reactants from the reactor product mixture, purifying them at least partially, and returning them to the catalytic reactor. Thus, the art has recognized that any steps which can be taken whereby the allowable oxygen concentration in the reactant gas mixture could be increased would be of great economic benefit so long as the lower explosive limit of oxygen in the reactant gas mixture is not exceeded.

An additional factor which has not been touched upon by the prior art in any specific way is that the catalysts employed in these processes, like practically all other catalysts used in the chemical industry, tend ultimately to lose their activity with time, necessitating either replacement or else operation under reduced space-time yield conditions. While this is always a problem in any catalytic process, it is a problem of particular importance in processes, like those under consideration here, where the catalyst is costly. For example, not only do the present catalysts contain substantial quantities of valuable metals such as palladiun and gold, but they are also typically prepared by complicated procedures entailing impregnating supports with noble metal salt solution, reducing the resulting precipitates to active form, etc. The result is that these processes typically have a very large catalyst investment, so that catalyst deactivation poses a serious economic problem.

It is accordingly, an object of the present invention to provide a method whereby, in a process for reacting an olefin, a carboxylic acid, and molecular oxygen in the presence of a catalyst to produce an unsaturated ester of the carboxylic acid, conversion in the process being limited by the need of controlling the oxygen concentration below the lower explosive limit, it becomes possible to operate at an increased oxyen concentration by altering the composition of the reactant feed gas mixture such that the lower explosive limit of oxygen concentration is higher than that hitherto known in the art.

It is another object to provide a method whereby the effective life of Group VIII noble metal catalysts employed in processes of the nature just described can be substantially extended without suffering an economically unacceptable diminution in space-time yield from the catalytic reactor.

It is a particular object to provide a method for increasing the vinyl acetate formation per reaction pass and for extending the effective catalyst life in a process for producing vinyl acetate which comprises passing a vapor or gas comprising ethylene, acetic acid, and molecular oxygen, typically in the presence of inert diluents such as carbon dioxide, through a reaction zone containing a solid catalyst comprising a Group VIII noble metal, particularly palladium.

Other objects of the invention will be apparent from the following detailed description and claims.

BRIEF SUMMARY OF THE INVENTION

In accordance with the present invention, the maximum allowable oxygen concentration in a fuel-rich gaseous mixture comprising a lower alkene and a carboxylic acid, particularly a mixture comprising ethylene and acetic acid, which is to be employed as feedstock for catalytic conversion to an unsaturated ester, e.g. an alkenyl ester of an alkanoic acid and particularly vinyl acetate, is elevated by diluting the gas mixture, prior to introducing it into the catalytic reaction zone, with a lower alkane gas, particularly an alkane which is free of secondary and tertiary hydrogen atoms and preferably an alkane comprising methane, ethane, or a mixture of the two. This makes it possible to incorporate into the reactant gases a concentration of molecular oxygen which is greater than that ordinarily obtaining at the lower oxygen explosive limit ordinarily characteristic of mixtures of oxygen with the other components of the reactant feed gas mixture. This in turn makes it possible to increase the conversion of the lower alkene and the carboxylic acid reactants per pass through the catalytic reactor without increasing catalyst temperature and, as a concomitant benefit, it makes it possible to operate a given catalyst charge for a longer period of time than would be the case if the alkane dilution method were not employed.

It is also possible, by employing this alkane dilution technique, to improve chemical efficiency while not raising the reaction conversion. That is, if desired, the increased oxygen concentration obtaining with the alkane dilution makes it possible, if desired, to reduce the reactor temperature appreciably in order to increase reaction chemical efficiency while keeping the reaction conversion unchanged. Depending largely upon the age of the catalyst and the nature of system bottlenecks which may be present, one may choose to use the alkane dilution technique and the resultant increased oxygen concentration to increase reaction converssion, or to reduce reaction temperature and so increase chemical efficiency, or, if desired, to obtain some of the benefits of each of the two alternatives.

DETAILED DESCRIPTION AND PREFERRED EMBODIMENTS

Generally speaking, the processing systems in which the invention is applied comprise, in combination, the following elements: (1) a reactor enclosing a reaction zone which contains the catalyst, typically a solid comprising a Group VIII metal or else a liquid reaction medium comprising predominantly the carboxylic acid which is one of the process reactants and containing a Group VIII metal along with a redox system and metal carboxylates; (2) a product recovery system within which a gaseous mixture of reaction products and unreacted reactants withdrawn from the reaction zone is separated into a crude product cut and a recycle fraction comprising unreacted feedstock, this fraction being typically a gaseous mixture comprising largely ethylene; and (3) a recycle purification system within which undesired components of the recycle stream, e.g., carbon dioxide and atmospheric gases such as argon, are removed from the recycle stream prior to returning it to the reaction zone for further conversion. This last-named recycle purification system may in some instances consist of little more than provisions for continuously withdrawing a purge stream to prevent buildup of inert contaminants beyond a certain level; but in some instances, for example in processes for reacting ethylene and acetic acid over a solid catalyst in the vapor phase, an important section of the recycle purification system comprises means, such as alkaline scrubbing systems, for removing carbon dioxide, which is a significant reaction by-product.

Taking the conversion of ethylene and acetic acid to vinyl acetate as a commercially important exemplification, operation of the system just described comprises introducing ethylene, molecular oxyen, and acetic acid into the reaction zone as the first step of the process. Typically all three of these reactants are introduced in the vapor phase, but it will be recognized that the acetic acid may be introduced as liquid in those processes in which a liquid-irrigated catalyst bed or a liquid comprising an acetic acid solution of the reaction catalyst is employed. Whichever approach is taken, the mixture of reactants introduced into the reaction zone comprises predominantly organic compounds (ethylene or a mixture of ethylene and acetic acid), with the amount of oxygen being much lower, of the order of 5 volume percent, whereby the feed mixture is on the fuel-rich or oxygen-poor side of the range of potentially explosive mixtures of oxygen with the organic compounds. Reaction is effected in the reaction zone between the ethylene, acetic acid, and oxygen to convert one mole of ethylene and one mole of acetic acid to one mole of vinyl acetate, consuming also in the process one-half mole of molecular oxygen which is converted to water. This over-all stoichiometry applies regardless of the details of reaction mechanisms, which are not relevant otherwise to understanding and applying the present invention. Theories of reaction mechanisms are generally known in the art and are discussed, for example, in the publications which have been previously identified above.

In those processes entailing maintenance of a liquid reaction medium within the reaction zone, some catalyst deactivation occurs continuously, and there is a drawoff of a portion of the liquid medium from the reaction zone for continuous regeneration of deactivated catalyst; in those processes involving a vapor-phase reaction in the presence of the solid catalyst, no such auxiliary operations are involved although it is necessary, at infrequent intervals, to replace the catalyst charge when its activity has declined to an unacceptably low level.

In any event, whether the reaction system of the vapor phase type or the liquid phase type, the vinyl acetate product is contained in a gaseous reaction product mixture continuously withdrawn from the reaction zone.

The gaseous product mixture comprises vinyl acetate, unreacted ethylene, unreacted acetic acid, various organic by-products including, for example, acetaldehyde, a substantial quantity of carbon dioxide, and also a quantity of atmospheric gases including argon and nitrogen which are present as a result of having been initially introduced as minor contaminants of the oxygen and which tend to build up within the recycle system. Typically, although the present invention is not restricted to processes producing such a mixture, the gaseous reaction product as produced in the vapor-phase process typically comprises, by volume, aproximately 54% ethylene, 8% acetic acid, 3% molecular oxygen, 30% inerts including water vapor, and 5% vinyl acetate. As initially withdrawn from the reaction zone, this gas may be at a temperature between 130° and 210°C and at a pressure between about 5 and 15 atmospheres absolute. More frequently, the reaction zone may be operated at about 150° to 190°C and about 7 to 12 atmospheres absolute.

After withdrawal from the reaction zone the gaseous reaction product is separated into a liquid fraction (comprising the vinyl acetate product), waste gases, and a gas recycle stream. Typically this separation is effected by first passing the gases through a condenser wherein a part of the vinyl acetate is dropped out as a liquid along with unreacted acetic acid and other liquefiable components, followed by passing the partly gaseous and partly liquid condenser product through a gas-liquid separator system. Gas from the separator is scrubbed with water to recover additional quantities of uncondensed vinyl acetate, aqueous solution from the scrubber being then combined with liquid from the gas-liquid separation system and distilled to recover vinyl acetate product and an acetic acid cut (which is recycled to the reaction zone). The scrubbed gas stream from the scrubber, after withdrawal of a set fraction as a gas purge for the purpose of preventing continued buildup of inerts such as argon and nitrogen, is scrubbed with a carbon dioxide-absorbing liquid to remove at least a fraction of the contained carbon dioxide and prevent its uncontrolled buildup. The scrubbed gas, comprising largely unreacted ethylene, is then recycled to the reaction system, where, after incorporation of additional quantities of ethylene and acetic acid as well as additional oxygen, the resulting reactant gas mixture is then reintroduced into the reaction zone for further conversion.

Although the pressure drop suffered by the reaction product gases in passing through the recovery system just described is not excessive (it is of the order of about 5 atmospheres), the recycle stream is very large in proportion to the product stream, and the power required for recompressing the scrubbed recycle stream back to reaction zone pressure is ssubstantial. In large installations centrifugal compressors are typically employed for this purpose, and this power requirement relates to a particularly preferred embodiment of the present invention, which will be discussed later hereinbelow.

As is explained in the paper by Schwerdtel in "Chemistry and Industry" previously mentioned, safety considerations necessitate carefully controlling the oxygen content of the gaseous reactants introduced into the reaction zone below that level at which explosion can occur. For example, at a pressure of 8 kilograms per square centimeter gauge, the explosive limit of the recycle gas (which is substantially free of acetic acid) is about 7 volume percent oxygen; higher concentrations of oxygen must be avoided in the art as known heretofore. At the reactor inlet, a maximum oxygen content of 7 to 8% by volume in the mixed reactant gases (calculated on the basis of dry, or acetic acid-free, gas) is taught by Schwerdtel. Under these conditions the conversion of ethylene per reaction pass is indicated to be approximately 10%; acetic acid conversion is approximately 20% while oxygen conversion is approximately 60–70%.

The foregoing summarizes the basic reaction system employed in converting ethylene and acetic acid, in the presence of oxygen, to vinyl acetate, specifically with reference to carrying out the process in the presence of a solid catalyst comprising a Group VIII noble metal with ethylene, acetic acid, and oxygen all being passed through the reaction zone in the vapor phase. The central point as relates to the present invention is that safety considerations necessitate strictly limiting the oxygen content of the gases fed into the reaction zone, with resulting limitation on maximum obtainable reaction conversion.

Although it will be understood that full details of operating a catalytic reaction system for converting ethylene and acetic acid to vinyl acetate are outside the scope of the present invention, an understanding of certain process parameters as they relate to reactor space-time yield is helpful inasmuch as the present invention relates to maximizing space-time yield:

As previously explained, conversion is limited by the necessity of controlling the oxygen content of the feed gases at a level which is below that at which an explosive mixture would be present. As previously explained, this is in the neighborhood of 7 to 8% by volume on the acetic acid-free basis. Ethylene concentration is typically about 50 to 70 volume percent, higher concentrations not being objectionable but being ruled out, as a practical matter, by the presence of other gases such as carbon dioxide which it is not practical (for economic reasons) to eliminate entirely from the recycle system.

Reactor throughput is advantageously controlled by adjusting the throughput and reaction temperature, in combination with one another, until, of the ethylene which is converted within the reaction zone, more than about 5%, and less than about 15%, is converted to carbon dioxide. Conversion of ethylene to vinyl acetate is, essentially, a dependent variable. These reaction adjustments are made with the reactor temperature being controlled within the range of about 150°C to about 190°C. Outside the preferred range of 5 to 15% conversion of ethylene to carbon dioxide, excessively high conversions to carbon dioxide are associated with decreased efficiency to vinyl acetate, while conversions to carbon dioxide below the preferred range are associated with a decreased reactor productivity. At a catalyst ages and becomes deactivated, the desired conversion to carbon dioxide (and vinyl acetate) can be maintained by increasing the reaction zone temperature, but the space-time yield nevertheless decreases. Conversely, if reaction temperature is not increased as the catalyst deactivates, the space-time yield as well as the conversion per pass both decline, and it becomes necessary to reduce reactor throughput in order to avoid a buildup of oxygen in the recycle system to an unsafe level. However the reactor is controlled, the ultimate result of catalyst deactivation is that it becomes necessary to reduce reactor throughput and space-time yield if both the desired chemical efficiency and the desired control of oxygen concentration within the limits of safety are to be maintained.

The net result of the interaction of the above-described parameters is that as a given charge of catalyst declines in activity, the resulting tendency for oxygen to build up in the recycle system makes it necessary, even though reactor temperature be increased progressively, to reduce the oxygen addition rate to avoid buildup of an explosive concentration of oxygen in the system. This is in the face of the fact that, as already known to the art, oxygen concentration is already a limiting factor in the reaction rate, and any decrease in oxygen concentration causes a decrease in space-time yield. It should be mentioned that ethylene concentration has been found to be less important; the reaction is limited much more sharply by oxygen concentration than by ethylene, ethylene always being present in any event in substantial stoichiometric excess.

The present invention provides a method for reducing the constraint imposed by the maximum allowable safe oxygen concentration characteristic of the prior-art technology just described. That is, while the interactions of the several process parameters just discussed are not altered by the present invention, it does provide a method for reducing the effect to which one of the parameters-oxygen concentration-limits reactor productivity. Otherwise, the interaction of the several process parameters continues to be as outlined above and the use of the 5–15% selectively to carbon dioxide continues to be a recommended guide in controlling the reactor.

The present invention lies in the discovery that a very substantial increase in conversion rate can be obtained, and the useful operating life of solid reaction catalysts can also be extended, by diluting the reactant gases with certain lower alkanes prior to introduction into the reaction zone, while concomitantly the oxygen content of the mixed reactant gases is increased above that normally employed in the prior art. The alkane dilution increases the maximum allowable safe oxygen concentration even though alkanes are themselves combustible. Typically, although the invention is not limited to a direct 1:1 replacement of alkene (e.g., ethylene) with alkane (e.g., methane or ethane), the alkane dilution is carried out in what amounts to a one-for-one replacement of alkene with alkane on the volume basis, while the volume concentration of oxygen is actually increased above that previously considered to be the maximum allowable. Oxygen concentration goes up throughout the entire system, including the gas recycle system, but the presence of the alkane allows this to be done safely. The result is that reactor space-time yield is increased above that previously obtainable with a given catalyst or, alternatively, the space-time yield can be maintained unchanged while chemical efficiency is increased by reducing the reaction temperature below the level previously employed. Partially deactivated catalyst can also be restored to a higher productivity by using the increased oxygen concentration, especially if increased oxygen concentration is combined with a slight elevation of reaction temperature.

Further particulars regarding the nature of the alkane diluent and typical conditions obtaining when employing this technique are given below.

Some favorable effect on the explosive limit obtains when any of a large number of inert gases is employed to dilute the reactant feed mixture. For example, nitrogen and carbon dioxide have some favorable effect. The effect of lower alkanes is surprisingly pronounced, however, and alkanes which are free of primary and secondary hydrogen atoms are particularly suitable, since they are more inert chemically in this system than other alkanes. Methane, ethane, and neopentane are particularly suitable, with methane, ethane, or a mixture of methane and ethane being especially recommended from the practical standpoint since these compounds are readily available and low in cost. Ethane is actually somewhat more effective than methane on a molar basis, but methane, because of its lower molecular weight, has unique advantages in many commercial installations as mentioned hereinabove. Specifically, the very large gas recycle system which is maintained between the product recovery system and the reaction zone (previously explained) typically comprises large centrifugal compressors. A recycle gas containing a given volume percent of methane has a lower average molecular weight than a gas having the same composition except with the methane being replaced by ethane or a higher molecular weight alkane. This means that a recycle gass containing methane as the diluent requires less power in a centrifugal recycle compressor system than one containing ethane or a higher alkane. The saving in operating cost obtained by using methane is significant, since the gas recycle is very large in these systems.

The beneficial effect of the alkane dilution obtains to some degree even at very low dilution ratios. Appreciable practial benefits obtain especially, however, when the alkane is introduced into the reactant gases, prior to feeding the resulting mixture into the reaction zone, in such an amount that the resulting diluted mixture contains from about 0.1 to about 0.8 mole of the alkane diluent per mole of contained ethylene. The upper limit just named is significant only in that dilution ratios above this limit may begin to affect space-time yield adversely even though the explosive limit-raising effect of the alkane dilution still obtains. While pressure is not a critical process parameter, the alkane dilution effect obtaining over a very wide range of pressures including atmospheric, particularly useful embodiments of the invention obtain at system pressures between about 5 and about 15 atmospheres absolute. More particularly, the invention has great commercial utility at pressures between about 7 and 12 atmospheres absolute.

Regarding temperature, the present invention is particularly useful in preparing reactant gas mixtures which are to be passed through a reaction zone maintained at a temperature between about 130°C and 210°C. Particular commercial utility obtains in processes in which the reaction zone temperature is controlled between about 150° and 190°C.

Regarding the composition of the diluted reactant gases, containing the alkane diluent and ready to be introduced into the reaction zone, it will be recognized that any mixture of ethylene and inert gases (with or without acetic acid being present) is improved in the matter of maximum allowable safe oxygen concentration by the incorporation of one of the alkane diluents. Typically, however, in processes for reacting ethylene, acetic acid, and molecular oxygen in the vapor phase in the presence of a solid catalyst comprising a Group VIII noble metal, desirable reactant feed gas mixtures prepared according to the present method and including recycle components which are normally present will comprise, by volume, approximately 40 to 60% ethylene, 5 to 30% alkane diluent (preferably methane), 7 to 14% acetic acid, at least about 5% and preferably about 6 to 10% molecular oxygen, and the remainder inert gases including (predominantly) carbon doxide, nitrogen, argon, and water vapor. By comparison, a comparable gas mixture prepared in accordance with the prior art processes and not containing the alkane diluent in appreciable quantity will comprise about 50 to 70% ethylene and not more than about 8% molecular oxygen.

Regarding the several individual components of the mixture set forth above, it should be mentioned that argon actually has an adverse effect on explosibility. That is, it lowers the safe allowable oxygen concentration. Thus, although as a practical matter it cannot easily be done, eliminating argon altogether would have a beneficial effect with the result that the oxygen content could safely be increased above that listed above. It is also to be noted that the upper limit of oxygen listed above is, for safety reasons, slightly below the absolute upper limit at which an explosive mixture would begin to be present. More particularly, with a gas mixture of the composition given above it is recommended that, in no event, an oxygen content greater than about 10 volume percent be allowed when the reaction zone is to be operated at a temperature between about 150° and 190°C and at a pressure between about 7 and 12 atmospheres absolute.

The following examples are given to illustrate the invention further. It will be recognized that many variations can be made therefrom within the scope of the invention.

EXAMPLE I

In a continuously operating installation within which a gaseous mixture comprising ethylene, acetic acid, molecular oxygen, and recycled inert gases including carbon dioxide, nitrogen, and oxygen was being converted to a product gas mixture comprising vinyl acetate by being passed through a reaction zone containing a solid catalyst bed comprising palladium, gold, and an alkali metal acetate on an inorganic inert support, oxygen content of the mixture of reactant feed gases being controlled at about 8 volume percent, the incorporation of methane into the reactant feed gases was initiated, along with an increased oxygen feed rate, in an amount such that the methane-diluted gas including also the increased oxygen concentration comprised, by volume, approximately 44% ethylene, 10% methane, 12% acetic acid, 8% molecular oxygen, and 26% carbon dioxide, nitrogen, argon, and water vapor. The reaction zone pressure was maintained at approximately 10 atmospheres absolute, and reaction zone temperature was approximately 170°C. Prior to adjustment of the gas concentration by addition of the methane and increase in the oxygen addition rate, the mixed reactant gases had contained approximately 54% ethylene, 1% methane, 12% acetic acid, 7% molecular oxygen, and 26% carbon dioxide, argon, nitrogen, and water vapor, and the reaction zone had been operating at a pressure of approximately 10 atmospheres absolute and a temperature of approximately 170°C.

Prior to introducing the methane diluent into the reactant feed gases along with increasing the oxygen content as just described, the reactor had been operating at its maximum sustainable space-time yield. Efforts to increase space-time yield by increasing the oxygen content would not have been feasible because of the danger of approaching the oxygen explosive limit in the system. Efforts to increase conversion by raising the reaction zone temperature would not have been feasible because it was known that this would have shifted reaction conditions undesirably far in the direction of increased carbon dioxide formation and reduced vinyl acetate formation.

After instituting the methane dilution and increasing the oxygen content of the reactant feed gases as described above, the yield of vinyl acetate per unit time per unit volume of catalyst bed was increased by approximately 15% over the space-time yield obtaining before instituting the methane dilution and increasing the oxygen concentration as described. Total reactor throughput was substantially the same after the institution of methane dilution as described, while the throughput of ethylene was actually lower after instituting the methane dilution, even though the space-time yield of vinyl acetate from the reactor was increased. The conversion of ethylene per reaction pass was increased from 10% before adding the methane and increasing the oxygen content to approximately 12% per pass after the change was made. The selectivity of conversion of ethylene to carbon dioxide was substantially the same before and after the methane dilution; i.e., approximately 1% of the ethylene fed to the reactor was converted to carbon dioxide.

EXAMPLE II

In a vinyl acetate reaction system identical with that described in Example I and operating without methane dilution, with an oxygen content in the reactant gas mixture being introduced into the reaction zone of approximately 7 volume percent, catalyst deactivation due to catalyst age had resulted in a decline of about 15% in the space-time yield of vinyl acetate from the reactor. As the catalyst had become progressively more deactivated, it had been necessary to reduce the reactor throughput rate to avoid under-reaction and the consequent buildup of oxygen in the recycle gas system to unsafe levels.

Composition of the reactant feed gas mixture was continuously maintained substantially identical with that described above in Example I (before methane dilution), while reactor throughput was progressively lowered in order to prevent a buildup of oxygen concentration as just described.

Ethylene content of the mixed reactant feed gases was then reduced from 54 volume percent to 44 volume percent, while methane was introduced into the mixture in place of the ethylene which had been removed. Concurrently, the rate of oxygen addition was increased, such that the oxygen concentration, by volume, was increased from 7% before the modification in composition to 8% after the modification. With the total mass throughput of reactants through the reactor being substantially the same after the methane dilution as before the methane dilution, and with the selectively of conversion of ethylene to carbon dioxide per pass being substantially unchanged, the production of vinyl acetate from the reactor per unit time was approximately 15% higher after the methane dilution than it had been previously. Reactor pressure was kept unchanged at approximately 10 atmospheres absolute, and reactor temperature was approximately 170°C before the methane dilution and 170°C afterward.

The embodiments of the invention in which an exclusive property or privilege is claimed are defined as follows:

1. In a process for preparing vinyl acetate by passing a gaseous reactant mixture comprising molecular oxygen, ethylene, and acetic acid through a reaction zone maintained at a pressure between about 5 and about 15 atmospheres absolute and containing a catalyst comprising a Group VIII noble metal and reacting said ethylene, oxygen, and acetic acid in the presence of said solid catalyst to form vinyl acetate, the composition of said gaseous reaction mixture being controlled on the fuel-rich side of the range of potentially explosive mixtures of oxygen with the remaining components of said reaction mixture, the degree of conversion of the reactants within said reaction zone being limited by the necessity of maintaining the concentration of oxygen therein below the lower explosive limit, the improvement which comprises:

raising the lower explosive limit of oxygen in said reactant gas mixture, and so facilitating safe operation at an increased oxygen concentration, by incorporating from about 0.1 to about 0.8 moles per mole of ethylene of a diluent gas consisting essentially of a lower alkane which is free of secondary and tertiary hydrogen atoms into said reactant gas mixture prior to passing it through said reaction zone.

2. The improvement of claim 1 wherein the catalyst is a solid and wherein the diluent gas consists essentially of at least one member of the group consisting of methane and ethane which is incorporated into the reactant gas mixture in such an amount that the resulting diluted mixture as introduced into the reaction zone contains from about 0.1 to about 0.8 mole of alkane diluent per mole of ethylene.

3. The improvement of claim 2 wherein the gaseous reactant mixture, prior to incorporation of the diluent thereinto, comprises, on the oxygen-free basis, about 50 to 70 volume percent ethylene, 7 to 14 volume percent acetic acid, and the remainder inert gases comprising predominantly carbon dioxide with minor amounts of methane, ethane, nitrogen, argon, and water vapor.

4. The improvement of claim 3 wherein the noble metal catalyst comprises palladium and the reaction in the reaction zone is conducted at a pressure between about 5 and 15 atmospheres absolute and at a temperature between about 130°C and 210°C.

5. The improvement of claim 4 wherein the diluent gas is methane.

6. The improvement of claim 5 wherein, after introduction of the diluent, the reactant gases introduced into the reactor comprise by volume, approximately 40 to 60% ethylene, 5 to 30% methane, 7 to 14% acetic acid, 6 to 10% molecular oxygen, and the remainder minor inert gases comprising carbon dioxide, arbon, nitrogen, and water vapor, and wherein the reaction zone is controlled at a temperature between about 150° and 190°C and at a pressure between about 7 and 12 atmospheres absolute.

7. The improvement of claim 3 wherein the diluent gas is incorporated into the reactant gas mixture by replacing a portion of the ethylene with the diluent gas on an approximately mole-for-mole basis.

8. The improvement of claim 3 further characterized by the method of maintaining optimal sustained reaction zone productivity after said alkane dilution by adjusting the reaction zone temperature within the range of about 150°C to 190°C as necessary to maintain the portion of ethylene converted to carbon dioxide within the range of about 5% to 15% of the total amount of ethylene converted to all reaction products per reaction pass, said adjustment comprising raising the reaction zone temperature to increase said conversion to carbon dioxide and reducing said temperature to reduce said conversion.

* * * * *

PO-1050
(5/69)

UNITED STATES PATENT OFFICE
CERTIFICATE OF CORRECTION

Patent No. 3,855,280          Dated December 17, 1974

Inventor(s) Glen Maurice Severs, Jr.

It is certified that error appears in the above-identified patent and that said Letters Patent are hereby corrected as shown below:

In column 1, line 39, for "comprising" read -- comprises --.

In column 5, line 27, after "system" insert -- is --.

In column 7, line 22, for "At a" read -- As a --.

In column 12, line 38, for "arbon" read -- argon --.

Signed and sealed this 18th day of February 1975.

(SEAL)
Attest:

RUTH C. MASON
Attesting Officer

C. MARSHALL DANN
Commissioner of Patents
and Trademarks